United States Patent [19]

Simpson, III

[11] Patent Number: 4,802,812
[45] Date of Patent: Feb. 7, 1989

[54] APPARATUS FOR HARVESTING ROW CROPS

[76] Inventor: Leland S. Simpson, III, 4275 N. Chateau Fresno, Fresno, Calif. 93711

[21] Appl. No.: 754,179

[22] Filed: Jul. 12, 1985

[51] Int. Cl.$^4$ ............................................. B60P 1/00
[52] U.S. Cl. ................................ 414/508; 56/328.1; 99/516; 414/523
[58] Field of Search ............... 414/508, 507, 523, 502, 414/503, 527, 528; 56/328 R, 329, 16.4; 99/516, 534

[56] References Cited

U.S. PATENT DOCUMENTS

| | | |
|---|---|---|
| Re. 27,528 | 11/1972 | Looker et al. |
| 2,249,792 | 7/1941 | Skinner ........................ 99/534 X |
| 2,378,847 | 6/1945 | Harris . |
| 2,656,968 | 10/1953 | Tidwell . |
| 2,782,943 | 2/1957 | Jones et al. . |
| 3,080,698 | 3/1963 | Beckman . |
| 3,182,437 | 5/1965 | Ramacher et al. ............ 56/328 R |
| 3,223,444 | 12/1965 | Tart ................................. 414/508 X |
| 3,305,113 | 2/1967 | Gardner . |
| 3,340,935 | 9/1967 | Csimma . |
| 3,390,768 | 7/1968 | Button . |
| 3,453,018 | 7/1969 | Love et al. . |
| 3,490,217 | 1/1970 | Olmo et al. . |
| 3,537,236 | 11/1970 | Fridley ........................... 414/508 X |
| 3,641,738 | 2/1972 | Johnson ......................... 414/508 X |
| 3,827,446 | 8/1974 | Honeycutt ..................... 414/508 X |
| 3,910,439 | 10/1975 | Ross et al. ..................... 414/508 X |
| 4,172,352 | 10/1979 | McCarthy et al. . |
| 4,255,922 | 3/1981 | Hiyama et al. . |

Primary Examiner—David A. Bucci
Attorney, Agent, or Firm—Worrel & Worrel

[57] ABSTRACT

An apparatus for harvesting row crops having a mobile frame; harvesting units mounted on the frame and adapted for individual movement under the control of field workers borne thereby toward and from the row crop for harvesting of the crop therefrom; and in the preferred embodiment, an assembly mounted on the frame for depolying a continuous tray on the earth surface bearing the crop so harvested for sun drying thereof.

11 Claims, 6 Drawing Sheets

APPARATUS FOR HARVESTING ROW CROPS

BACKGROUND OF THE INVENTION

1. Field Of The Invention

The present invention relates to an apparatus for harvesting row crops and more particularly to such an apparatus operable at moderate cost manually to harvest row crops and wherein a plurality of picking stations are independently movable toward and from the row crops for purposes of accessability and having particular utility in the harvesting of grapes for drying to form raisins.

2. Description Of The Prior Art

The harvesting of agricultural crops is a very highly labor intensive operation, and therefore expensive whether such harvesting is performed manually or by mechanical harvesting equipment. As the expensive of manual harvesting increased over the years, due in part to minimum wage laws, more extensive development work was carried out with mechanical harvesters. However, the mechanical harvesters presently available are characterized by very high purchase and maintenance costs. Such costs are not within a price range which would be practical for many farming operations and particularly those of smaller scale. However, even for large scale farming operations the expense of purchasing and maintaining such equipment constitutes an inordinantly great portion of overall operating costs. Furthermore, mechanical harvesters have in many instances suffered from other drawbacks including frequent breakdown, damage to trees, vines, or other plants, damage to related equipment, damage to the crops themselves and less thorough harvesting than would be desirable.

For example, conventional grape harvesting operations typically entail the use of large numbers of field workers who move along the rows of grapevines within the vineyards picking grapes by hand. Alternatively, a variety of types of mechanical harvesters may be employed. In the case of table grapes, the crop is frequently packed in lug boxes in the vineyard, sometimes using packing trailers. In the case of wine grapes, the harvested crop is commonly dumped into bins or gondolas for delivery to the winery. In the production of raisins, the grapes are most commonly placed on trays for sun drying in the vineyard. In some cases, the grapes, while still on the vines, are sprayed with a solution such as methyl oleate which substantially removes the waxy outer coating that protects the fruit from the sun. The grapes are permitted to sun dry on the vines and are then harvested. The foregoing constitute the most common processes currently in use, but there are variations of these as well as other processes, such as drying of grapes to form raisins in drying houses, which are less frequently employed.

The direct labor and equipment costs in these conventional practices have become overwhelming. But there are other problems incident to the use of such processes. For example, in the case of manual harvesting, the repeated bending, stooping and walking related to picking are, in themselves, conducive to fatigue and wasted time and effort. Not only is this unpleasant for the laborers, but fatigue is a substantial factor in limiting their output. It has been shown in the harvesting of particular agricultural produce that as much as forty-eight percent of a field worker's time may be consumed in walking to and from the area where he is picking, emptying the produce that he has harvested and repositioning for continued picking.

In the case of conventional mechanical harvesters, there are considerable delays in the harvesting operations due to mechanical breakdown; the chronic tendency for such devices to damage irrigation systems, trellis structures and other equipment; and the inevitable production of trash in the form of leaves, twigs, dust, dirt and rock which becomes inextricably mixed with the harvested crop.

Therefore, it has long been known that it would be desirable to have an improved apparatus for harvesting row crops that could be purchased and operated at moderate cost to enhance the ease and dependability with which row crops can be harvested while reducing to an absolute minimum the problems associated with such harvesting and thereby affording the capability of harvesting row crops at minimum overall cost, producing a superior harvested crop and without the multitude of impediments which have long plagued agriculture.

SUMMARY OF THE INVENTION

It is therefore an object of the present invention to provide an improved apparatus for harvesting row crops.

Another object is to provide such an apparatus which is operable to obtain the individual benefits to be derived from manual and mechanical harvesting while avoiding the detriments individually associated therewith.

Another object is to provide such an apparatus which is operable to reduce to a minimum the overall cost of harvesting.

Another object is to provide such an apparatus which is particularly well suited to transporting a plurality of field workers along row crops for purposes of harvesting without undue strain or fatigue to the field workers.

Another object is to provide such an apparatus which transports the field workers along a row crop to be harvested and wherein the field workers have the capability of moving toward or from the row for accessability to the crop independently of the other field workers.

Another object is to provide such an apparatus which is particularly well suited to the harvesting of grapes from rows of grapevines and which is operable in one embodiment to deploy a continuous paper tray in the area between adjoining rows of grapevines and in a selected position which is most advantageous to the sun drying of the grapes to form raisins.

Another object is to provide such an apparatus which is operable to apply a drying agent to the grapes during harvesting to facilitate the drying of the grapes into raisins.

Another object is to provide such an apparatus which is of moderate cost to purchase and maintain and which substantially bolsters the productivity of field workers involved in the harvesting operation.

Further objects and advantages are to provide improved elements and arrangements thereof for an apparatus for the purposes intended which is dependable, economical, durable and fully effective in accomplishing its intended purposes.

These and other objects and advantages are achieved in an apparatus adapted for transport in earth traversing movement along a row crop bearing field workers in work stations individually positionable relative to the crop, possessing a collection system operable to receive and deliver the crop so harvested by the field workers and to separate extraneous material therefrom and, in one embodiment, having subsystems operable to apply a drying agent to the crop and to dispose the crop in the optimum position for drying.

DESCRIPTION OF THE PREFERRED EMBODIMENT

Figures 1, 11:
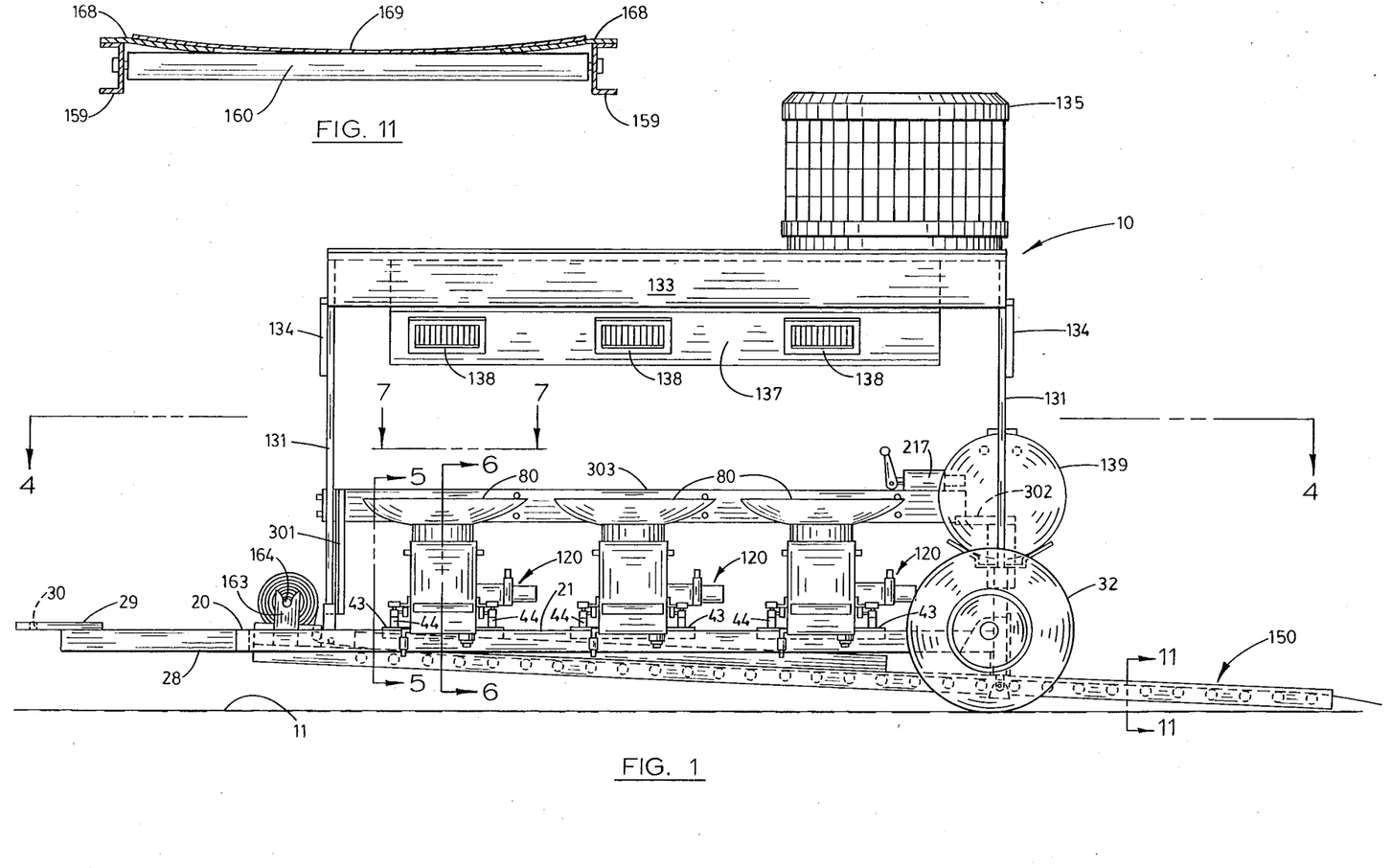
FIG. 1 is a side elevation of the apparatus for harvesting row crops of the present invention shown in typical operative configuration.
FIG. 11 is a somewhat enlarged, transverse, vertical section of the conveyor assembly of the apparatus taken on line 11—11 in FIG. 1.
Figure 2:
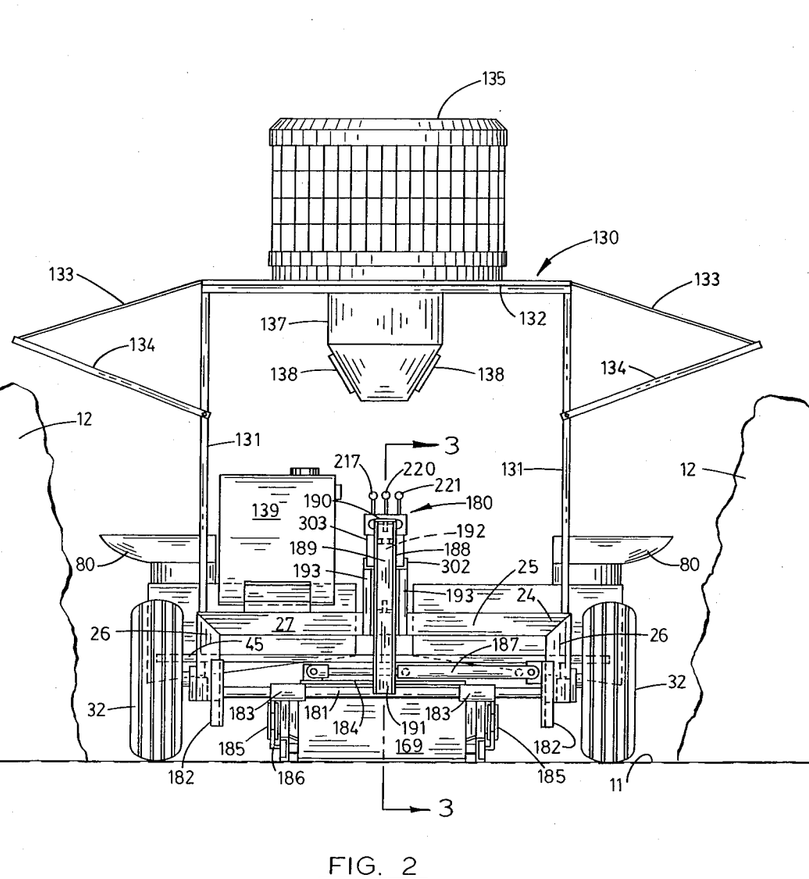
FIG. 2 is a rear elevation of the apparatus of FIG. 1.

Referring more particularly to the drawings, the apparatus for harvesting row crops of the present invention is generally indicated by numeral 10 in FIG. 1. As will hereinafter be described in greater detail, the apparatus is adapted for transport over the earth surface 11 between adjoining rows of row crops 12, as best shown in FIG. 2. For illustrative convenience, the row crops shown and described herein are rows of grapevines. However, it will be understood that the apparatus can be employed in the harvest of a wide variety of types of row crops.

Figure 4:
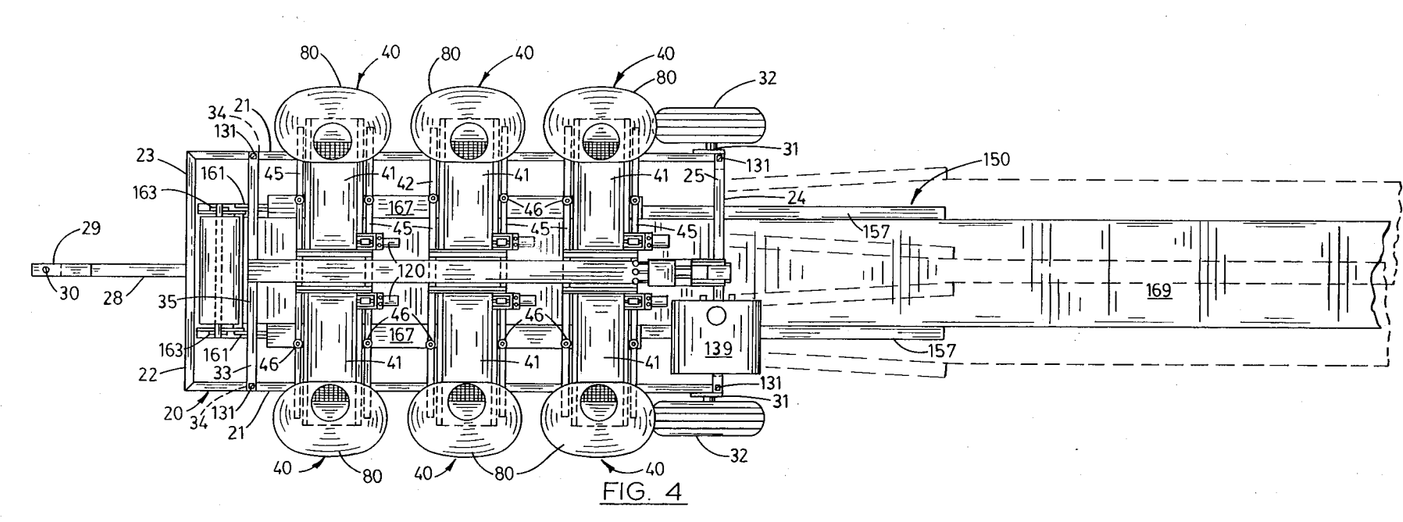
FIG. 4 is a somewhat reduced, horizontal section taken on line 4—4 in FIG. 1 showing the conveyor assembly in full lines in a centered position and in phantom lines in alternate positions.

The apparatus 10 has a mobile main frame 20 having a pair of spaced substantially parallel longitudinal frame members 21 interconnected by transverse frame members 22 mounted on and extending in spaced, substantially parallel relation between the longitudinal frame members, as can best be seen in FIG. 4. The main frame has a forward portion 23 and an opposite rearward portion 24 relative to its intended direction of travel. The ends of the longitudinal frame members 21 at the rearward portion 24 of the main frame 20 are interconnected by a main guide beam 25 having an inverted U shape with substantially parallel vertical guide portions 26 individually mounted on the longitudinal frame members and interconnected by an integral horizontal portion 27 disposed higher on the main frame than the longitudinal frame members 21, as best shown in FIG. 2.

A tongue member 28 is mounted on the transverse frame member 22 on the forward portion of the main frame 20 centrally thereof and extending in right angular relation thereto for towing by a suitable vehicle such as a tractor, not shown. The tongue member mounts a hitch plate 29 having a hole 30 therein for purposes of connection to a towing vehicle using a pin, not shown, extended therethrough and through the hitch of the towing vehicle. A pair of wheel assemblies 31 mounting wheels 32 thereon for rotational movement are individually mounted on the longitudinal frame members 21 at the rearward portion 24 of the main frame, as shown in FIG. 4. Thus, the apparatus is adapted for earth traversing movement on the wheels 32 while being towed by the towing vehicle in a direction from right to left as viewed in FIG. 4. While there are believed to be substantial advantages in towing of the apparatus as described, it will be apparent that the apparatus can be constructed so as to be self-propelled without departing from the scope of the invention.

A support beam 33 is mounted on and interconnects the longitudinal frame members 21 adjacent to the forward portion 23 of the main frame 20. the support beam is substantially of an inverted U shape having upstanding side portions 34 individually mounted on the longitudinal frame members 21 and an interconnecting horizontal portion 35.

As perhaps best shown in FIG. 4, the apparatus 10 has six work stations 40, three on each side of the main frame 20. Within each work station is a harvesting unit 41 facing laterally of the main frame with respect to the intended direction of travel of the apparatus. Thus, there are three laterally facing harvesting units on each side of the apparatus. The harvesting units are substantially identical to each other and therefore are described together herein. It will be understood that except where otherwise noted, each harvesting unit has the elements which will hereinafter be described for one such harvesting unit.

Figure 3:
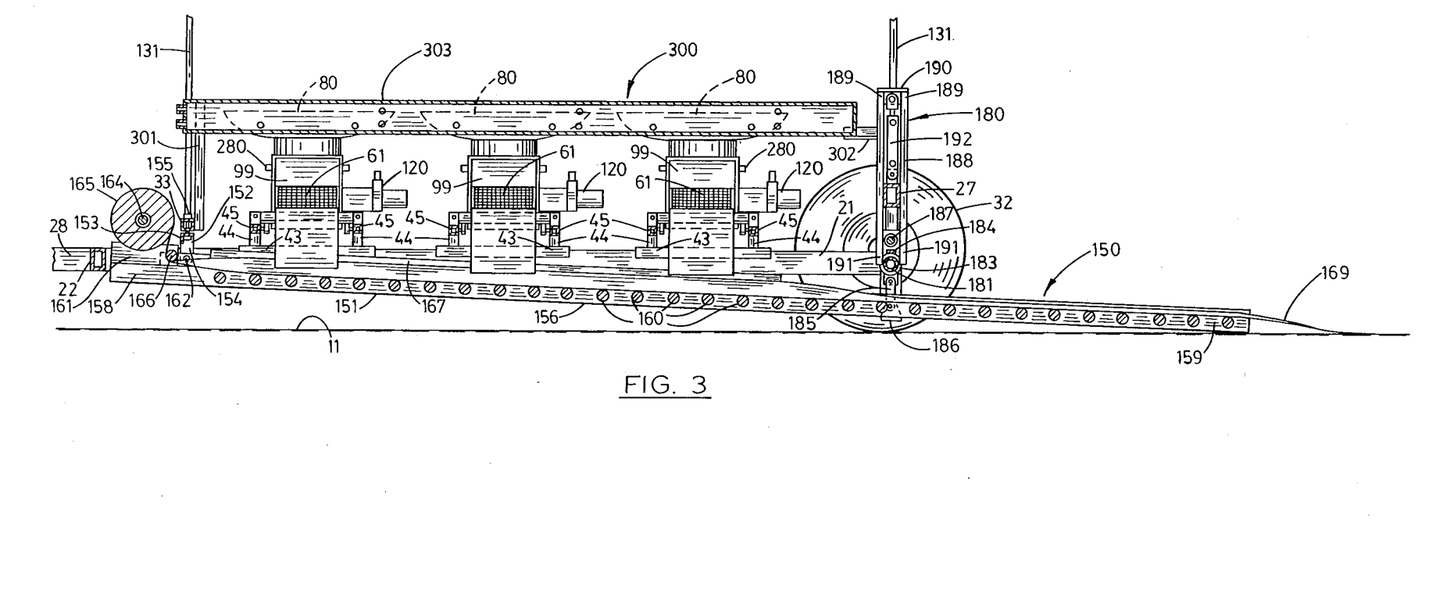
FIG. 3 is a fragmentary, longitudinal, vertical section taken on line 3—3 in FIG. 2 showing a conveyor assembly of the apparatus in full lines in a lowered position.
Figure 5:
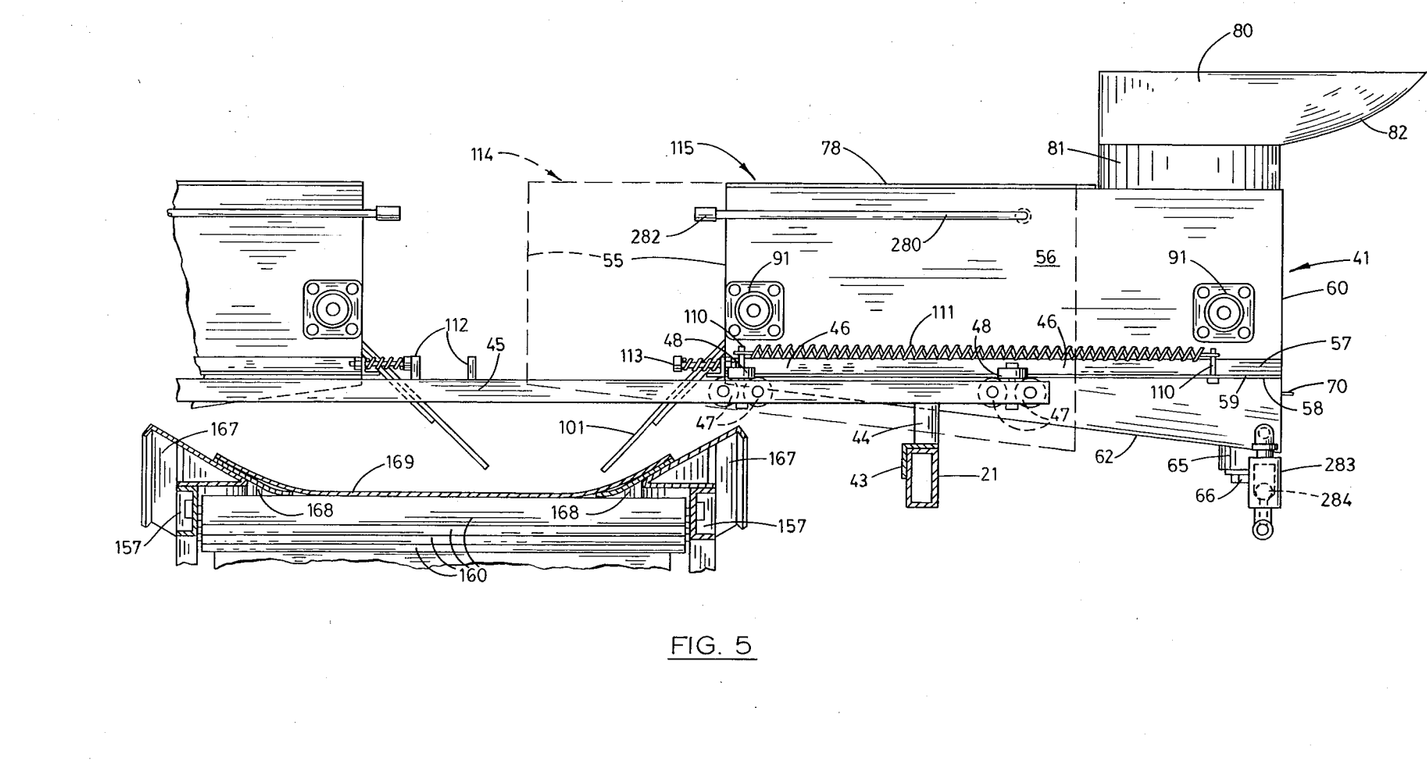
FIG. 5 is a somewhat enlarged, fragmentary, transverse, vertical section taken on line 5—5 in FIG. 1 showing one of the harvesting units of the apparatus in full lines in an extended position and in phantom lines in a retracted position.
Figure 6:
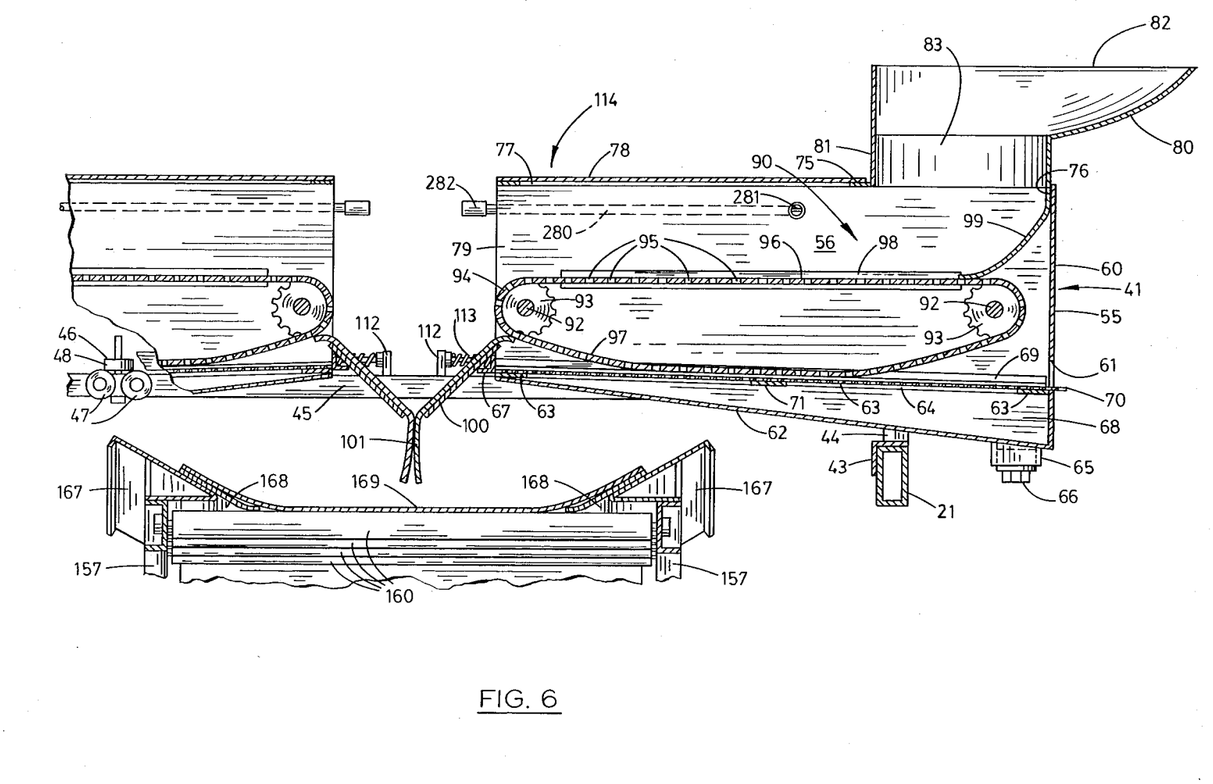
FIG. 6 is a somewhat enlarged, fragmentary, transverse, vertical section taken on line 6—6 in FIG. 1 and showing the harvesting unit of FIG. 5 in full lines in the retracted position.

The six harvesting units 41 are mounted on a subframe 42 mounted in overlaying relation to the main frame 20 of the apparatus 10. The subframe 42 has an angle iron foot 43 secured on the longitudinal frame member 21 in each work station 40, as shown in FIG. 3, in mating engagement therewith as shown in FIGS. 5 and 6. Each angle iron foot 43 has a pair of supports 44 mounted thereon in spaced, substantially parallel upstanding relation. A cross beam 45 is mounted on and interconnects the corresponding supports of corresponding work stations on opposite sides of the apparatus. Thus, a pair of cross beams extend in spaced, substantially parallel relation transversely of the apparatus interconnecting corresponding work stations on opposite sides of the apparatus. The cross beams extend laterally of the longitudinal frame members on opposite sides of the apparatus.

A pair of harvesting unit mounting assemblies 46 is mounted in spaced relation on each cross beam 45 of the subframe 42 within each work station 40. Thus, there are four such harvesting unit mounting assemblies within each work station. Each of the harvesting unit mounting assemblies has a pair of support rollers 47 rotationally mounted in tandem relation on the inwardly facing surface of its respective cross beam. Each of the harvesting unit mounting assemblies has a horizontal guide roller 48 mounted for rotational movement on the upwardly facing surface of its respective cross beam.

Each harvesting unit 41 has a main housing 55 having opposite side walls 56 on which are individually mounted angle iron rails 57. The angle iron rails have horizontal portions 58, which are rested on the support rollers 47 of each mounting assembly 46 in supported rolling engagement therewith, and outer edges 59, which engage in rolling relation the guide rollers 48 of the mounting assemblies. Thus, as can best be visualized in FIG. 5, each harvesting unit is mounted for horizontal rolling movement in the mounting assemblies.

The main housing 55 of each harvesting unit has an outer end wall 60 mounted on and interconnecting the opposite side walls and having a rectangular trash discharge opening 61 therein. The main housing has a reservoir 62 mounted on and interconnecting the lower edges of the opposite side walls and the end wall and sloping downwardly to a point beneath the end wall, as best shown in FIG. 6. The reservoir has lip portions 63 which are return bent inwardly of the housing to define a shelf bounding an opening 64. The reservoir has a drain housing 65 mounted thereon adjacent to the end wall and having a drain plug 66 removably, screw-threadably mounted therein. An angle iron mounting bar 67 is mounted on and interconnects the side walls and reservoir of the main housing opposite the end wall. The mounting bar extends laterally of the side walls 56 in opposite directions, as is visible in FIG. 7. The lower portions of the side walls and the reservoir are sealed along their adjoining edges in fluid tight relation to form a chamber 68. An angle iron member 69 is mounted on each side wall 56 within the main housing aligned with each other to define a common, substantially horizontal plane spaced from the reservoir a predetermined distance and communicating with the lower portion of the trash discharge opening 61. A filter screen 70, preferably having a relatively fine gauge such as window screen, is slidably received between the angle iron members and the lip portions 63 of the reservoir in covering relation to the opening 64 of the reservoir and, in the installed position shown in FIG. 6, forming a lower boundary for the trash discharge opening and extending a short distance outwardly therefrom. A screen support plate 71 is affixed on the lip portions 63 of the reservoir and extends across the opening 64 in supporting relation to the filter screen.

The main housing 55 has a top wall 75 mounted on the upper edges of the side walls 56 and end wall 60. The top wall has front and rear openings 76 and 77 respectively. A cover plate 78 is removably secured in covering relation to the rear opening of the top wall. The top wall, side walls and mounting bar 67 bound and thereby define a crop discharge opening 79.

Each of the harvesting units 41 mounts a crop receiver 80, preferably constructed of a moderately flexible plastic material. The crop receiver is mounted on the top wall 75 within the front opening 76 thereof. The crop receiver has a throat portion 81 which is secured within the front opening and a flared collector portion 82 thereabove opening outward to receive the harvested crop deposited thereon. The throat portion bounds and thereby defines a passage or throat 83 communicating with the interior of the harvesting unit. The flexibility of the crop receiver is preferably such as to be sufficiently rigid to support the crop deposited thereon during harvesting so that it slides through the throat 83 and sufficiently flexible to give somewhat upon contact with obstacles. The crop receivers are preferably sufficiently laterally flared that the crop receivers of adjoining harvesting units extend to points in juxtaposition to each other.

A conveyor assembly 90 is mounted on and within each harvesting unit 41. The conveyor assembly of each harvesting unit includes a pair of bearings 91 mounted on each side wall 56 of the harvesting unit in predetermined spaced relation. A conveyor shaft 92 is mounted for rotational movement in and interconnecting corresponding bearings 91. Thus, there are a pair of conveyor shafts interconnecting the side walls in spaced, substantially parallel relation. Two sprockets 93 are mounted on each conveyor shaft in predetermined spaced relation to each other for rotational movement with their respective shaft. A conveyor belt 94, having a multiplicity of relatively small holes 95 extending therethrough, is entrained on the sprockets for movement therewith in a counterclockwise direction, as viewed in FIG. 6. The conveyor belt has an upper run 96, which is entrained on the sprockets in such a manner as to be taught, and a lower run 97 which is relatively loose so as to drape downwardly into or near to contact with the filter screen 70. The lower run is moved, as will hereinafter be described, from left to right as viewed in FIG. 6.

A pair of angle iron conveyor guides 98 are individually mounted on the side walls 56 of the harvesting unit 41 within the main housing 55 in supporting relation to the upper run 96 of the conveyor belt 94 as shown in FIG. 6. A crop diverting panel 99 is secured on the end wall 60 within the main housing extending from the throat portion 81 of the crop receiver 80 and curved downwardly into rested engagement with the upper run of the conveyor belt. A mounting plate 100 is affixed on the mounting bar 67 extending from a position at the bottom of the crop discharge opening 79 downwardly at an oblique angle. A flexible panel 101 is fastened on the mounting plate so as to extend from a point in contact with the lower run 97 of the conveyor belt to a position beyond and below the mounting plate.

Figure 7:
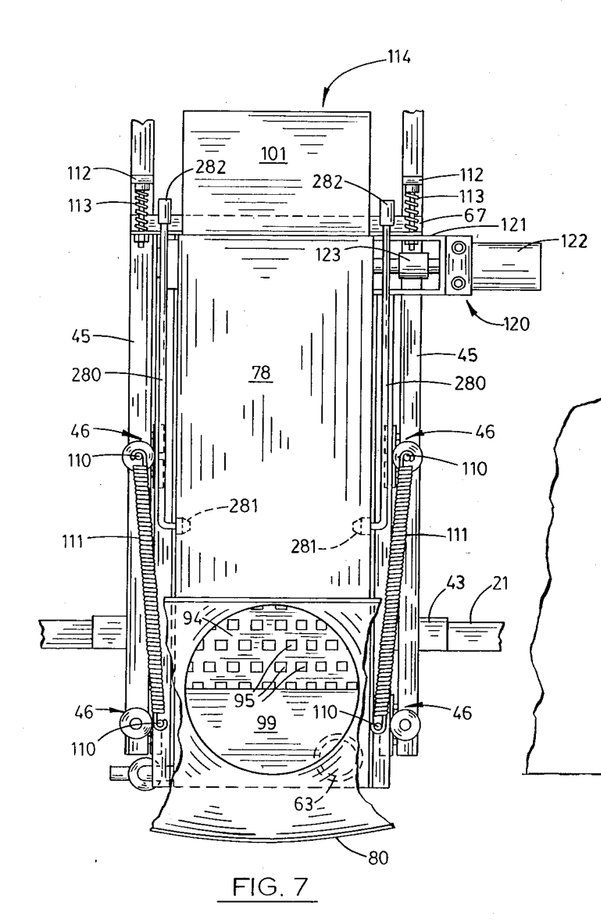
FIG. 7 is a somewhat enlarged, fragmentary, horizontal section taken on line 7—7 in FIG. 1 with some surfaces removed to show the structure thereunder.

As can be seen best in FIGS. 5 and 7, spring pins 110 are individually mounted in upstanding relation on the inwardmost mounting assemblies 46 and on the angle iron rails 57 adjacent to the end wall 60 of the main housing 55. The spring pins on common sides of the main housing are interconnected by a tension spring 111. Stop plates 112 are mounted in upstanding relation on the cross beams in predetermined positions relative to their respective cross beams and the harvesting units 41 mounted thereon. The stop plates of common end portions of the cross beams of each harvesting unit define a plane substantially right-angularly related to the cross beams, as can best be seen in FIG. 7. Shock absorbers 113 are individually mounted on the opposite ends of the mounting bar 67 of each harvesting unit in individual alignment with the stop plates of that harvesting unit for contact therewith. The tension springs 111 of each harvesting unit resiliently retain the harvesting unit in a retracted position 114 shown in full lines in FIG. 6 and in phantom lines in FIG. 5 with the shock absorbers 113 in engagement with the stop plates. However, each harvesting unit can be moved in the mounting assemblies 46 with moderate effort against tension of the tension springs from the retracted position and as far as an extended position 115 shown in full lines in FIG. 5 wherein the opposite ends of the mounting bar 67 engage the guide rollers 48 of the mounting assemblies.

A conveyor drive assembly 120 is mounted on the side wall 56 of each harvesting unit 41 on the right as viewed in FIG. 7. The conveyor drive assembly includes a frame 121 mounted on the side wall and, in turn, mounting an hydraulic motor 122. A drive linkage 123 operatively interconnects the hydraulic motor and the rearward conveyor shaft 92 in driving relation thereto. The arrangement of the conveyor drive assemblies 120 of the respective harvesting units is preferably as shown in FIG. 4 for purposes of convenience in extending the hydraulic lines thereto.

A roof assembly 130 is mounted on the main frame 20 of the apparatus 10 in covering relation to the work stations 40. The roof assembly has four upright supports 131 individually mounted at suitable points on the main frame and supporting a rigid roof structure 132 in covering relation to the work stations. Awnings 133 are affixed on the marginal edges of the roof structure and are held in the extended positions shown in FIG. 2 by awning supports 134 individually pivotally mounted on the upright supports 131. If desired, the awning supports on opposite sides of the roof structure can be pivoted toward each other to fold the awnings backwardly into rested relation on top of the roof structure.

A cooling unit 135, such as an evaporative cooler having an internal water pump 136, is mounted on the upper surface of the roof structure. The cooling unit communicates with a cooling duct 137 affixed on the lower surface of the roof structure and having air vents 138 individually facing each of the work stations 40. A water reservoir 139 is mounted on the horizontal portion 27 of the main guide beam 25 and is operatively connected to the cooling unit by a supply line 140 connected to the water pump 136 thereof and return line 141. The cooling unit is operable to cool ambient air using water from the water reservoir and to blow the cooled air through the cooling duct 137, from the air vents 138 and on to the work stations.

The preferred embodiment of the apparatus 10 has a tray control assembly 150 mounted on the main frame 20 and extending therebeneath as can perhaps best be seen in FIG. 3. As will hereinafter become more clearly apparent, the apparatus can be adapted to harvesting a variety of crops and handling them in a variety of ways. As shown herein, the apparatus is adapted for use in harvesting grapes and disposing them on the ground on a tray for drying to form raisins. However, for example, the tray contol assembly can be replaced by a conveyor system for delivery of the grapes to a gondola to be taken to a winery to be made into wine, or to a packing trailer for packing in lug boxes for sale as table grapes. In the preferred embodiment shown and described herein, however, the tray control assembly is mounted on the apparatus.

The tray control assembly 150 has a frame 151 having a support beam 152 of inverted U shape. The support beam has a central angle iron portion 153 mounting substantially right-angularly related pivot plates 154 at the opposite ends thereof. A pivot pin 155 mounts the angle iron portion in suspended relation on the horizontal portion 35 of the support beam 33, as shown in FIG. 3, for pivotal movement about the substantially vertical axis of the pivot pin. The tray control assembly includes a roller conveyor 156 having substantially parallel side beams 157 with corresponding front portions 158 and opposite trailing portions 159. The side beams mount and are interconnected by a plurality of rollers 160 extending rotationally therebetween in substantially parallel relation. Side plates 161 are mounted in upstanding relation on the front portions of the side beams 157. Pivot pins 162 individually pivotally interconnect the side plates and the pivot plates 154 of the support beam 152 to mount the roller conveyor 156 for pivotal movement about the substantially horizontal axis defined by the pivot pins. Tray roll mounting frames 163 are individually borne by the side plates and support a roll mounting shaft 164 removably extending therebetween in supported relation thereon. As shown in FIGS. 1, 2 and 3, a tray roll 165 is rotationally mounted on the mounting shaft between the mounting frames. The roll consists of a continuous paper tray wound into the roll. Such rolls are conventionally available.

A tray roller 166 is rotationally mounted on and interconnects the side plates 161 in spaced, substantially parallel relation to the tray roll 165. Tray guides 167 are individually mounted on the side beams and extend partially over the respective ends of the rollers 160. Flexible panels 168 are affixed on the tray guides and side beams, as shown in FIGS. 5, 6 and 11, and are rested on their interior edges on their respective opposite ends of the rollers. For illustrative convenience, a length of tray 169 is extended from the tray roll 165 under the tray roller 166, over the rollers 160 and tray guides 167 and flexible panels 168 and from the tray control assembly between the trailing portions 159 of the side beams.

The tray control assembly 150 also has an attitude adjustment assembly 180 most readily visible in FIGS. 2 and 3. The attitude adjustment assembly has a cylindrical beam 181 individually mounting channel shaped guides 182 at the opposite ends thereof which are slidably engaged with the vertical guide portions 26 of the main guide beam 25. A pair of support sleeves 183 are slidably received on the cylindrical beam and are rigidly interconnected in predetermined spaced relation by a connecting plate 184. A linkage 185 is pivotally mounted on each sleeve at one of its ends and is pivotally connected at the other of its ends to a support plate 186 mounted on and extending beneath the side beams 157 in supporting relation thereto. An hydraulic cylinder assembly 187 is mounted on and interconnects the guide 182 on the right, as viewed in FIG. 2, and the connecting plate 184. Thus, the hydraulic cylinder assembly is expandable and contractable to move the support sleeves 183 along the cylindrical beam 181 and thus the trailing portions 159 of the side beams and thereby the roller conveyor 156 to the left or to the right as viewed in FIG. 2. The tray control assembly is accordingly pivoted about the pivot pin 155.

The attitude adjustment assembly 180 has a lifting frame 188 including a pair of channel members 189 interconnected at their upper ends by a cross plate 190 and extending downwardly in spaced, substantially parallel relation on opposite sides of the horizontal portion 27 of the guide beam 25 and slidable relative thereto. The channel members have lower end portions 191 which are secured on the cylindrical beam 181 between the support sleeves 183. An hydraulic cylinder assembly 192 is mounted on and interconnects the horizontal portion 27 of the guide beam 25 and the cross plate 190. A pair of guide members 193 are mounted on the horizontal portion 27 on opposite sides of the channel members 189 to capture the channel members 189 for movement upwardly or downwardly only along a vertical path of travel. Thus, the cylindrical beam 181 and the roller conveyor 156 supported thereon can be raised from or lowered into ground engagement by expansion or contraction respectively of the hydraulic cylinder assembly 192. Such movement is permitted by the pivot pins 162 above the front portions of the side beams 157.

Figure 8:
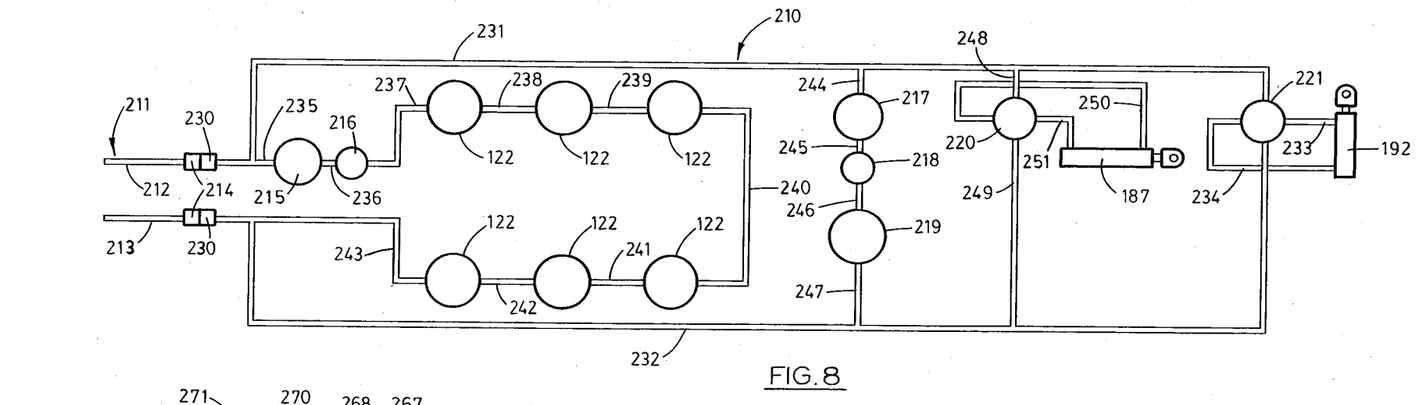
FIG. 8 is a schematic diagram of an hydraulic system of the apparatus.

The apparatus 10 has an hydraulic system 210 shown in the schematic diagram of FIG. 8. The hydraulic system, in the preferred embodiment, is adapted to be operated from the available hydraulic system 211 of the towing vehicle, not shown, such as a tractor. The hydraulic system of the towing vehicle, as shown in FIG. 8, has a pressure line 212 and an exhaust line 213 each of which mounts a connector 214. A two-way valve 215 and flow control 216 are borne by the towing vehicle.

The hydraulic system 210 of the apparatus 10 includes the six hydraulic motors 122 of the harvesting units 41. The hydraulic system 210 also includes a two-way valve 217, a flow control 218 and an hydraulic motor 219 all for operation of the cooling unit 135. The hydraulic system also has a four-way valve 220, for the operation of the hydraulic cylinder assembly 187, and a four-way valve 221, for the operation of the hydraulic cylinder assembly 192.

The hydraulic system 210 further includes connectors 230 individually releasably attached in fluid transferring relation to the connectors 214 of the towing vehicle. Hydraulic line 231 interconnects the connector 230 communicating with the pressure line 212 and the four-way valve 221. Hydraulic line 232 interconnects four-way valve 221 and connector 230 communicating with exhaust line 213. Hydraulic line 233 interconnects four-way valve 221 and the hydraulic cylinder assembly 192, as shown in FIG. 8. Hydraulic line 234 interconnects the opposite end of the hydraulic cylinder 192 and the four-way valve 221. Hydraulic line 235 interconnects hydraulic line 231 and two-way valve 215. Hydraulic line 236 interconnects two-way valve 215 and flow control 216. Hydraulic line 237 interconnects flow control 216 and a first of the hydraulic motors 122. Hydraulic line 238 interconnects the first hydraulic motor 122 and a second of the hydraulic motors 122. Hydraulic line 239 interconnects the second hydraulic motor 122 and a third of the hydraulic motors 122. Hydraulic line 240 interconnects the third hydraulic motor 122 and a fourth of the hydraulic motors 122. Hydraulic line 241 interconnects the fourth hydraulic motor 122 and a fifth of the hydraulic motors 122. Hydraulic line 242 interconnects the fifth hydraulic motor 122 and a sixth of the hydraulic motors 122. Hydraulic conduit 243 interconnects the sixth hydraulic motor and hydraulic line 232.

Hydraulic line 244 interconnects hydraulic line 231 and two-way valve 217. Hydraulic line 245 interconnects two-way valve 217 and flow control 218. Hydraulic line 246 interconnects flow control 218 and hydraulic motor 219. Hydraulic line 247 interconnects hydraulic motor 219 and hydraulic line 232. Hydraulic line 248 interconnects hydraulic line 231 and four-way valve 220. Hydraulic line 249 interconnects four-way valve 220 and hydraulic line 232. Hydraulic line 250 interconnects four-way valve 220 and the hydraulic cylinder assembly 187 as shown in FIG. 8. Hydraulic line 251 interconnects the opposite end of the hydraulic cylinder 187 and the four-way valve 220.

Figure 9:
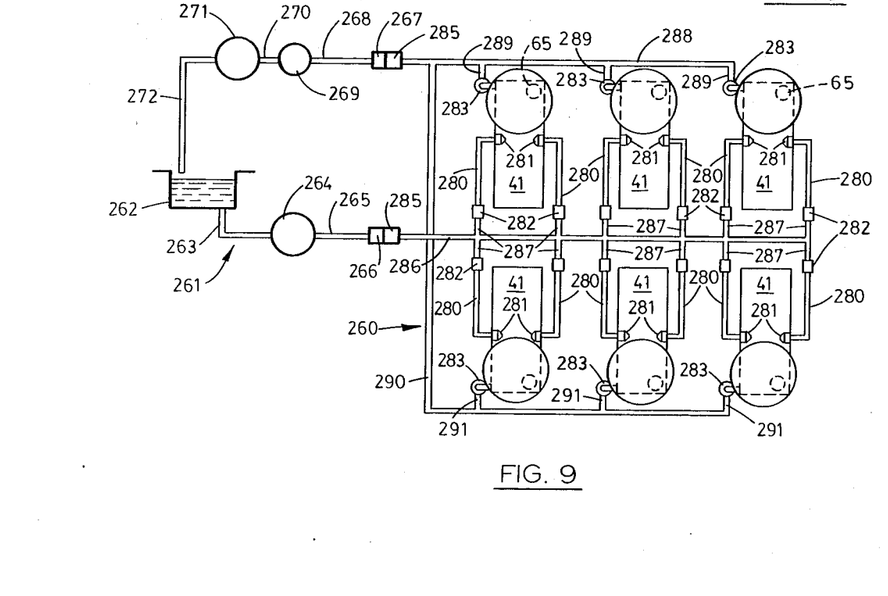
FIG. 9 is a schematic diagram of a crop spraying system of the apparatus.
Figure 10:
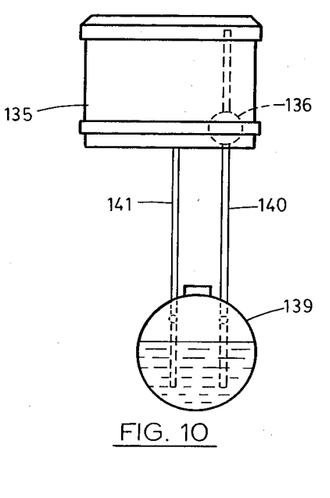
FIG. 10 is a schematic diagram of an evaporative cooling system of the apparatus.

The apparatus 10, in the preferred embodiment, has a spray system 260 shown in the schematic diagram of FIG. 9. The spray system is operable, as will hereinafter be described, to apply a drying agent to the harvested crop immediately after harvest and prior to deposit on the length of tray 169 for sun drying. For example, the drying agent can be a solution containing methyl oleate, which is operable to remove the waxy coating which naturally protects grapes from the sun's light. Removal of this coating thereby enhances drying of the grapes upon exposure to sunlight.

As shown in FIG. 9, the spray system 260 is operable from the fluid system 261 of the towing vehicle. The fluid system 261 has a fluid reservoir 262 connected by a conduit 263 to a pump 264 in fluid supplying relation. A conduit 265 interconnects the pump 264 and a connector 266. Similarly, a connector 267 is connected by a conduit 268 to a filter 269. A conduit 270 interconnects the filter 269 and a pump 271. A return conduit 272 extends from pump 271 back to the reservoir 262. All of the fluid system 261 is borne by the towing vehicle.

The spray system 260 of the apparatus 10 has a rigid spray conduit 280 mounted on and extending through each side wall 56 of each harvesting unit 41. The spray conduits extend through the side walls of each harvesting unit, as best shown in FIG. 7, so that the common ends thereof face each other while the portions thereof externally of the harvesting units extend substantially parallel to the side walls to positions just rearwardly of and to the sides of the crop discharge opening 79. The portions of the spray conduits within each harvesting unit individually mount spray nozzles 281 which, for a given harvesting unit, face toward each other. The portions of the spray conduits rearwardly and to the sides of the crop discharge opening 79 individually mount connectors 282. A float valve assembly 283 is mounted on the lowest portion of the reservoir 62 of each harvesting unit, as best shown in FIG. 5. Each float valve assembly has an internal float ball 284 which maintains the float valve in an open condition when there is fluid in the reservoir 62, but which closes or seals the float valve assembly by seating gravitationally in the event all of the fluid drains from the reservoir. This prevents air from entering the spray system 260.

The spray system 260 has connectors 285 adapted for releasable attachment to the connectors 266 and 267 respectively of the fluid system 261 of the towing vehicle in fluid transferring relation. A supply manifold 286 is mounted on the connector 285 attached to connector 266 of the fluid system 261. Twelve branch conduits 287 individually interconnect the supply manifold and the connectors 282 of the spray conduits 280 in fluid supplying relation. A first return manifold 288 is mounted on the connector 285 attached to the connector 267 of the fluid system 261 in fluid transferring relation. Three connector conduits 289 individually interconnect the float valve assemblies 283 of the harvesting units 41 in the upper portion of the schematic diagram of FIG. 9 and the first return manifold in fluid supplying relation. A second return manifold 290 is connected to the first return manifold. Three connector conduits 291 individually interconnect the float valve assemblies 283 of the harvesting units in the lower portion of the schematic diagram of FIG. 9 and the second return manifold.

A central housing assembly 300 is mounted on the apparatus 10 running longitudinally of the apparatus and centrally thereof between the work stations 40 on opposite sides of the apparatus. The central housing assembly has a front support 301 mounted in upstanding relation on the support beam 33. A rear support assembly 302 is affixed on the guide members 193 of the attitude adjustment assembly 180. A control housing 303 is mounted on and extends between the front support and the rear support assembly. Portions of the hydraulic system 210 and spray system 260 are extended through the central housing as desired in order to protect them from damage and to retain them in position most appropriate for use. Similarly, the two-way valve 217, four-way valve 220 and four-way valve 221 are mounted on top of the central housing for purposes of accessability.

OPERATION

The operation of the described embodiment of the subject invention is believed to be clearly apparent and is briefly summarized at this point. The apparatus, drawn by a towing vehicle, not shown, attached to the hitch plate 29 is pulled through a vineyard to be harvested between adjoining rows of row crops or grapevines 12, as can best be seen in FIG. 2. At this time a field worker is seated on the cover plate 78 of each harvesting unit 41 straddling the main housing 55 thereof and facing the crop receiver 80. As can be visualized in FIG. 4, there are therefore three field workers on each side of the apparatus directly facing the row of grapevines on that side of the apparatus. Preferably each field worker supports his feet on the longitudinal frame member 21, or on foot rests, not shown. By applying pressure with his feet against the frame member 21 or the foot rests, the field worker can move his respective harvesting unit between the retracted and extended positions 114 and 115 respectively. The tension springs 111 operate to assist in returning the harvesting unit to the retracted position, but the field worker can easily override its affect by applying pressure in the manner described. If desired, suitable cushions or seats, not shown, can be positioned on the cover plates 78 of the respective harvesting units for use by the field workers.

The cooling unit 135 can be operated at this time, using the two-way valve 217, to cool the ambient air and direct it through the air vents 138 into the work stations 40 for the comfort of the field workers.

When the apparatus has been positioned as described between adjoining rows of grapevines 12 to be harvested, the attitude adjustment assembly 180 is operated to position the tray control assembly 150 as desired. This is accomplished by operation of the hydraulic system 210 using the four-way valves 220 and 221. Operation of four-way valve 220 to expand or contract the hydraulic cylinder assembly 187 accordingly moves the support sleeves 183 and thus the roller conveyor 156 to the left or to the right of the centered position shown in FIG. 2.

This is of considerable significance in the operation of the apparatus in that it allows the length of tray 169 to be positioned on the ground in the precise position most suited to sun drying of the harvested grapes to form raisins. In a vineyard in the northern hemisphere in which the rows of grapevines are parallel to each other along east-west axes and the apparatus is moving from east to west, the roller conveyor 156 can be moved to the right, as viewed in FIG. 2, or north, so that the length of tray will be placed nearer to the row of grapevines 12 on the right or, in other words, to the north. This will expose the grapes to the maximum amount of sunlight per day. In such a vineyard when the apparatus is moving from west to east, the roller conveyor can be moved nearer to the row of grapevines on the left or, in other words, north. In the southern hemisphere, of course, a reversal of this process to position the tray nearer the row crop 12 to the south will achieve the same purpose of maximizing the amount of sunlight to which the grapes are exposed. Additionally, of course, with other row crops, row crops planted in other ways or such other purposes as may be desired, the apparatus possesses a full capability for adjustment to the prevailing conditions.

Operation of the four-way valve 221 to expand or contract the hydraulic cylinder assembly 192 accordingly raises or lowers the roller conveyor 156 at the rear of the apparatus 10. The elevated position is for transport other than during harvesting. For harvesting, the roller conveyor is normally lowered until the trailing portions 159 are about ten inches above the earth surface 11. This allows the grapes to "cascade" along the tray in moving with the tray from the roller conveyor to the earth surface thereby distributing the grapes more evenly on the tray for drying. Of course, if desired, the trailing portions 159 can be lowered into rested engagement with the earth surface or disposed in any other desired positions.

The tray roll 165 is prepared for harvesting by drawing a length of tray 169 from the tray roll, extending it beneath the tray roller 166 and over the rollers 160, tray guides 167 and flexible panels 168. The length of tray is pulled along the entire length of the roller conveyor and the end thereof rested on the earth surface 11. Initially, as the apparatus begins movement, it is helpful to have someone stand on the end of the length of tray or otherwise to weight it until the weight of the harvested grapes deposited on the length of tray is such as to hold it in position on the earth surface. The length of tray thus unwinds from the tray roll as the apparatus moves between the row crops. This insures that such discharge of the length of tray is precisely at the ground speed of the apparatus no matter what that ground speed is.

The apparatus 10 is otherwise prepared for harvest by activating the hydraulic system 210 using the two-way valve 215. This drives the hydraulic motors 122 to drive the conveyor assemblies 90 of the harvesting units 41. The conveyor belts 94 are thus driven in counterclockwise directions as viewed in FIG. 6. The spray system 260 is charged with a suitable drying agent, such as a solution containing methyl oleate, and is activated from the towing vehicle to pump the solution through the spray system. The solution is thus sprayed from the nozzles 281 within each harvesting unit above the upper run 96 of the conveyor belt 94. The solution passes downwardly through the holes 95 in the conveyor belt and through the filter screen 70 and into the reservoir 62. From the reservoir the solution is pumped through the float valve assembly 283 back through the spray system to the reservoir 262 for reuse.

Subsequently, the apparatus 10 is drawn by the towing vehicle between the rows of grapevines 12 for harvesting. The field workers, equipped with suitable knives or shears, cut the bunches of grapes from the row which they face as the apparatus moves therealong. As previously described, by exerting pressure with their feet against the longitudinal frame members 21, they can position themselves and the crop receivers 80 of their respective harvesting units 41 in the optimum individual positions for harvesting. The bunches of grapes so harvested either fall on to the collector portions 82 of their respective crop receivers, or are placed thereon or into the throat 83 thereof by the field worker.

The bunches of grapes so harvested using each harvesting unit 41 fall on to the upper run 96 of the conveyor belt 94 where they are carried toward the crop discharge opening 79 while being sprayed with the solution from the nozzles 281. The speed of the conveyor assembly 90, and, more particularly, the upper run thereof, is preferably quite slow and just fast enough to avoid clogging the interior of the harvesting unit with the harvested grapes. This allows the bunches of grapes to be thoroughly soaked in the solution.

During this operation, small size trash or waste material such as dirt, small fragments of leaves and twigs and the like fall or are worked through the holes 95 in the conveyor belt 94 and on to the filter screen 70. The lower run 97 of the conveyor belt 94 effectively sweeps such waste material along the filter screen and from the trash discharge opening 61. The solution, as previously noted drains through the filter screen and into the reservoir 62 for reuse.

The bunches of grapes and any trash of larger size are transported on the upper run 96 through the crop discharge opening 79 where they slide down the flexible panel 101 onto the length of tray 169. The tray guides 167 and flexible panels 168 retain the length of tray in the concave configuration shown in FIGS. 5 and 6 as the tray passes at ground speed over the rollers 160 so as to prevent the crop falling from the length of tray.

The foregoing process is continued so that the harvested crop is deposited on the length of tray which is, in turn, deposited on the earth surface 11 for drying.

The apparatus for harvesting row crops of the present invention thus is operable greatly to increase the productivity of field workers in harvesting row crops by eliminating several steps common in conventional manual harvesting by removing the needless motion of stooping, bending and walking which tends to fatigue workers as they progress along the row crop and by facilitating access to the crop to be harvested. The apparatus achieves these operative benefits in an apparatus which is only of moderate expense to purchase and maintain, particularly as compared with harvesters of the fully mechanical type and without causing damage to the crop as in such harvesters. In the preferred embodiment of the invention a continuous tray can be deployed in the area between adjacent rows of the row crop in the optimum position to facilitate the drying of grapes to form raisins.

Although the invention has been therein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. An apparatus for harvesting row crops comprising a frame adapted for earth traversing movement along a first path substantially parallel to and laterally disposed with respect to a row crop, a harvesting unit borne by the frame for movement along a second path substantially transversely related with respect to the first path toward and from the row crop and adapted to receive a field worker thereon in a seated position facing the row crop for movement with the harvesting unit toward the row crop along the second path by the field worker manually moving the harvesting unit along said second path, means mounted on the harvesting unit for receiving the crop harvested from the row crop by the field worker and transporting said crop for collection, and resilient means connected to the harvesting unit for urging the harvesting unit along the second path from the row crop whereby said manual moving of the harvesting unit along said second path by the field worker is required only for movement along the second path toward the row crop and said resilient means returns said harvesting unit to a retracted position in movement from said row crop along the second path upon said field worker terminating manual resistance thereto.

2. The apparatus of claim 1 wherein said receiving and transporting means includes a conveyor having an upper run movable along a course from a position in receiving relation to the harvested crop to a collection position.

3. The apparatus of claim 2 wherein the conveyor has openings extending therethrough for the passage of foreign material therethrough and from the crop borne thereby and the harvesting unit has a discharge opening for the passage of said foreign material from the harvesting unit.

4. The apparatus of claim 3 wherein a substantially flat member is mounted on the harvesting unit beneath the conveyor and extends in feeding relation to said discharge opening and the conveyor has a lower run which is moved in the direction of the discharge opening and across said flat member to move said foreign material received on the flat member to the discharge opening.

5. The apparatus of claim 4 wherein the apparatus has a fluid system operable to release a fluid onto crops borne by said upper run of the conveyor, the flat member is a screen and the fluid system includes a reservoir mounted on the harvesting unit beneath said screen for receiving residual fluid which passes through the conveyor and the screen.

6. An apparatus for harvesting row crops comprising:
a frame adapted for movement along a path of travel substantially parallel to a row crop;
a pair of harvesting units mounted on said frame for individual movement along substantially parallel paths toward and from the row crops during said movement of the frame along said path of travel, each of the harvesting units of said pair adapted to receive a field worker for moving said harvesting unit along its respective path and harvesting the crop at said harvesting unit;
a conveyor assembly of the gravitational roller type mounted on said frame extending substantially longitudinally thereof and sloped toward the earth surface for deposit of an object borne thereby on the earth surface in trailing relation to the apparatus;
means mounted on the frame for deploying a continuous tray on to the conveyor assembly; and
means borne by the frame for delivering the crop harvested by said field workers from the harvesting units onto said tray and whereby weighting of the tray on the earth surface rearwardly of the frame as the frame moves along said path of travel pulls the tray and crop borne thereby relative to and along the conveyor assembly and onto the earth surface in trailing relation to the frame as the frame moves along the path of travel and at velocity substantially corresponding thereto.

7. An apparatus for harvesting row crops comprising:
a frame adapted for movement along a path of travel substantially parallel to a row crop;
a pair of harvesting units mounted on said frame for individual movement along substantially parallel paths toward and from the row crop during said movement of the frame along said path of travel, each of the harvesting units of said pair adapted to receive a field worker for moving said harvesting unit along its respective path and harvesting the crop at said harvesting unit;

a conveyor assembly mounted on said frame extending substantially longitudinally thereof for deposit of an object borne thereby on the earth surface in trailing relation to the frame, said conveyor assembly mounted for movement adjacent to the forward portion thereof with respect to the frame about a substantially horizontal axis and an adjustment assembly is mounted on and interconnects a rearward portion of the conveyor assembly and the frame and is selectively operable to move the conveyor assembly about said substantially horizontal axis to move the rearward portion of the conveyor assembly between raised and lowered positions;

means mounted on the frame for deploying a continuous tray onto the conveyor assembly; and means borne by the frame for delivering the crop harvested by said field workers from the harvesting units onto said tray.

8. An apparatus for harvesting row crops comprising:

a frame adapted for movement along a path of travel substantially parallel to a row crop;

a pair of harvesting units mounted on said frame for individual movement along substantially parallel paths toward and form the row crop during said movement of the frame along said path of travel, each of the harvesting units of said pair adapted to receive a field worker for moving said harvesting unit along its respective path and harvesting the crop at said harvesting unit;

a conveyor assembly mounted on said frame extending substantially longitudinally thereof for deposit of an object borne thereby on the earth surface in trailing relation to the frame, said conveyor assembly mounted for movement adjacent to the forward portion thereof about a substantially vertical axis and an adjustment assembly is mounted on and interconnects a rearward portion of the conveyor assembly and the frame and is selectively operable to move the conveyor assembly about said substantially vertical axis to move the rearward portion of the conveyor assembly between opposite lateral positions;

means mounted on the frame for deploying a continuous tray onto the conveyor assembly; and means borne by the frame for delivering the crop harvested by said field workers from the harvesting units onto said tray.

9. An apparatus for harvesting row crops during movement between two adjacent rows of the row crops, the apparatus comprising:

A. a frame adapted for movement along a path of travel between and substantially parallel to said adjacent rows, the frame having a longitudinal axis, opposite sides and forward and rearward portions;

B. a plurality of harvesting units mounted on the frame for movement therewith along said path of travel and for individual movement on the frame along individual paths of travel substantially normal to said longitudinal axis and extending to extended positions projected laterally of the frame, said harvesting units arranged on the frame in two groups, one group on each side of the frame, and each harvesting unit adapted to seat a field worker for movement with the harvesting unit along the individual path of travel thereof under the direction of said field worker and each harvesting unit having an opening for the receipt of crops harvested by the field worker;

C. a conveyor assembly mounted on and within each harvesting unit having an upper run movable between a position in receiving relation to crops received through said opening of the harvesting unit to a point of discharge adjacent to the longitudinal axis of the frame;

D. a second conveyor assembly mounted on the frame adjacent to the forward portion thereof for substantially pivotal movement about substantially horizontal and vertical axes and extended beneath the frame to the rearward portion thereof;

E. an attitude adjustment assembly mounted on and interconnecting the rearward portion of the frame and the second conveyor assembly and operable selectively to pivot the second conveyor assembly about said substantially horizontal and vertical axes to position the second conveyor assembly for use; and F. means borne by the frame adjacent to the forward portion thereof for dispensing a continuous tray on to the second conveyor assembly for movement therealong in receiving relation to crops discharged from the conveyor assemblies mounted on the harvesting units and from the second conveyor assembly onto the earth surface rearwardly of the rearward portion of the frame.

10. The apparatus of claim 9 wherein a fluid system is mounted on the apparatus including a discharge nozzle mounted on each harvesting unit positioned to release a crop treating fluid on the crops borne by the upper run of the conveyor assembly mounted on said harvesting unit.

11. The apparatus of claim 10 wherein each harvesting unit has a fluid receiving reservoir mounted thereon beneath the conveyor assembly of said harvesting unit, a filter screen is mounted in covering relation to said reservoir and the conveyor assembly of each of said harvesting units has a lower run movable across said filter screen to sweep foreign matter from the filter screen for discharge from the harvesting unit.

* * * * *

UNITED STATES PATENT AND TRADEMARK OFFICE
CERTIFICATE OF CORRECTION

PATENT NO. : 4,802,812
DATED : February 7, 1989
INVENTOR(S) : Leland S. Simpson, III It is certified that error appears in the above-identified patent and that said Letters Patent is hereby corrected as shown below:

On the Title Page,
In the Abstract, line 7, delete "depolying" and substitute
---deploying---

Column 1, line 18, delete "expensive" and substitute
---expense---

Signed and Sealed this

Twenty-fifth Day of July, 1989

Attest:

DONALD J. QUIGG

*Attesting Officer*  *Commissioner of Patents and Trademarks*